US009190849B2

(12) United States Patent
Won et al.

(10) Patent No.: US 9,190,849 B2
(45) Date of Patent: Nov. 17, 2015

(54) APPARATUS AND METHOD FOR PERFORMING WIRELESS CHARGING

(75) Inventors: Eun-Tae Won, Seoul (KR); Jae-Seung Son, Gyeonggi-do (KR); Joon-Ho Park, Gyeonggi-do (KR); Jun-Ho Koh, Gyeonggi-do (KR); Hee-Won Jung, Gyeonggi-do (KR); Do-Young Kim, Gyeonggi-do (KR); Seung-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/047,302

(22) Filed: Mar. 14, 2011

(65) Prior Publication Data

US 2011/0225073 A1 Sep. 15, 2011

(30) Foreign Application Priority Data

Mar. 12, 2010 (KR) ........................ 10-2010-0022520
Jul. 12, 2010 (KR) ........................ 10-2010-0066795

(51) Int. Cl.

| | |
|---|---|
| ***G07B 17/00*** | (2006.01) |
| ***H02J 5/00*** | (2006.01) |
| ***G06Q 30/06*** | (2012.01) |
| ***G06Q 50/06*** | (2012.01) |
| ***G06Q 40/00*** | (2012.01) |
| *H02J 7/00* | (2006.01) |
| *H02J 7/02* | (2006.01) |

(52) U.S. Cl.

CPC ................ *H02J 5/005* (2013.01); *G06Q 30/06* (2013.01); *G06Q 40/12* (2013.12); *G06Q 50/06* (2013.01); *H02J 7/0054* (2013.01); *H02J 7/0004* (2013.01); *H02J 7/025* (2013.01)

(58) Field of Classification Search

None

See application file for complete search history.

(56) References Cited

U.S. PATENT DOCUMENTS

| | | | | |
|---|---|---|---|---|
| 6,437,685 | B2 | 8/2002 | Hanaki | |
| 6,526,293 | B1 * | 2/2003 | Matsuo | 455/573 |
| 7,443,057 | B2 * | 10/2008 | Nunally | 307/149 |
| 7,705,565 | B2 * | 4/2010 | Patino et al. | 320/150 |
| 2002/0153862 | A1 | 10/2002 | Kuroki | |
| 2004/0142733 | A1 | 7/2004 | Parise | |
| 2005/0134213 | A1 | 6/2005 | Takagi et al. | |
| 2005/0194926 | A1 | 9/2005 | Di Stefano | |
| 2006/0113955 | A1 * | 6/2006 | Nunally | 320/108 |
| 2007/0103110 | A1 | 5/2007 | Sagoo | |
| 2007/0178945 | A1 * | 8/2007 | Cook et al. | 455/572 |
| 2008/0014897 | A1 * | 1/2008 | Cook et al. | 455/343.1 |
| 2009/0140690 | A1 | 6/2009 | Jung | |

(Continued)

FOREIGN PATENT DOCUMENTS

| | | |
|---|---|---|
| CN | 1956288 | 5/2007 |
| CN | 101459981 | 6/2009 |

(Continued)

OTHER PUBLICATIONS

European Search Report dated Aug. 20, 2015 issued in counterpart application No. 11753614.4-1804, 6 pages.

*Primary Examiner* — Fateh Obaid
(74) *Attorney, Agent, or Firm* — The Farrell Law Firm, P.C.

(57) ABSTRACT

A wireless charging method includes searching one or more rechargeable electronic devices, receiving power service information from one or more searched electronic devices, determining whether the one or more searched electronic devices are rechargeable based on the received power service information, and if the one or more searched electronic devices are rechargeable, receiving power from the electronic devices.

18 Claims, 7 Drawing Sheets

(56) References Cited

U.S. PATENT DOCUMENTS

| | | | | |
|---|---|---|---|---|
| 2009/0156268 | A1 | 6/2009 | Kim et al. | |
| 2009/0251309 | A1 | 10/2009 | Yamasuge | |
| 2010/0093429 | A1 * | 4/2010 | Mattice et al. | 463/25 |
| 2011/0279244 | A1 * | 11/2011 | Park et al. | 340/10.34 |

FOREIGN PATENT DOCUMENTS

| | | |
|---|---|---|
| EP | 1 780 863 | 5/2007 |
| JP | 2002-350520 | 12/2002 |
| JP | 2003-158651 | 5/2003 |
| JP | 2005-151609 | 6/2005 |
| JP | 2007-124890 | 5/2007 |
| JP | 2012-502612 | 1/2012 |
| JP | 2012-520057 | 8/2012 |
| KR | 10-0837637 | 6/2008 |
| KR | 1020080106186 | 12/2008 |
| KR | 1020090056546 | 6/2009 |
| WO | WO 2010/028092 | 3/2010 |
| WO | WO 2010/104803 | 9/2010 |

* cited by examiner

APPARATUS AND METHOD FOR PERFORMING WIRELESS CHARGING

PRIORITY

This application claims priority under 35 U.S.C. §119(a) to Korean Patent Applications filed in the Korean Intellectual Property Office on Mar. 12, 2010 and Jul. 12, 2010 and assigned Serial Nos. 10-2010-0022520 and 10-2010-0066795, respectively, the entire disclosures of which are incorporated herein by reference.

BACKGROUND OF THE INVENTION

1. Field of the Invention

The present invention relates generally to wireless charging, and more particularly, to an apparatus and method for performing wireless charging, to supply power, between electronic devices.

2. Description of the Related Art

A wireless charging technique, which is a wireless power technique, refers to a technique which enables a battery of an electronic device to be automatically charged when the electronic device is put on a charging pad without connecting it to an additional charger. Generally, wireless electric toothbrushes and wireless electric shavers are charged using the wireless charging technique and this technique is well-known. The wireless charging technique applied to such products has attracted attention because it enhances waterproof functionality and improves portability due to a wired charger becoming unnecessary.

The wireless charging technique may be broadly categorized into an electromagnetic induction type which uses coils, a wireless power transmission type which converts electric energy into microwaves for transmission, and a resonance type which uses a resonance phenomenon.

The electromagnetic induction technique works by transmitting power between a primary coil and a secondary coil. When moving a magnet around a coil, a current is induced and electricity is generated. That is, a transmitter generates a magnetic field and a receiver generates energy on behalf of the magnet. The electromagnetic induction technique has the advantage of efficient high-energy transmission. The electromagnetic induction technique has been put to practical use in the greatest number of areas and has been applied to a variety of electronic devices.

The resonance technique works by wirelessly transmitting power using a resonance-type power transmission principle even though a device is away from a charger by a few meters. The resonance technique uses a physical concept in which, for example, if a tuning fork vibrates, a wine glass near the tuning fork also vibrates at the same frequency. In the resonance technique, power is wirelessly transmitted by resonating electromagnetic waves containing electric energy instead of resonating sound.

The wireless power transmission technique works by wirelessly transmitting power by radio frequency/microwave radiation. The wireless power transmission technique is a new concept in power transmission in which power energy is converted for transmission into microwaves which are advantageous for wireless transmission.

Many electronic devices utilizing one of the various power transmission techniques have come to market. However, a use range of the power transmission technique employed up to now is limited to certain electronic devices, such as wireless electric shavers or a wireless electric toothbrushes, having a short distance from their chargers. Recently, as wireless charging techniques have been increasing in demand even in electronic devices, such as mobile terminals, for which mobility is important, a technique for wirelessly charging electronic devices irrespective of their locations has been demanded.

SUMMARY OF THE INVENTION

An aspect of the present invention is to address at least the above-mentioned problems and/or disadvantages and to provide at least the advantages described below. Accordingly, an aspect of the present invention provides an apparatus and method for performing wireless charging between electronic devices which subscribe to the same payment system in situations when battery charging cannot be performed.

In accordance with an aspect of the present invention, a wireless charging method includes searching one or more rechargeable electronic devices, receiving power service information from the one or more searched electronic devices, determining whether the one or more searched electronic devices are rechargeable based on the received power service information, and if the one or more searched electronic devices are rechargeable, receiving power from the electronic devices.

In accordance with another aspect of the present invention, a wireless charging apparatus includes a communication and control unit for searching one or more rechargeable electronic devices, receiving power service information from the one or more searched electronic devices, determining whether the one or more searched electronic devices are rechargeable based on the received power service information, and performs a control function to receive power from the one or more searched electronic devices when the one or more searched electronic devices are rechargeable, and a power receiver for receiving power from the one or more searched electronic devices under the control of the communication and control unit.

In accordance with a further aspect of the present invention, a wireless charging apparatus includes a communication and control unit for transmitting power service information upon receiving a request for transmission of power service information from one or more electronic devices, and determining whether to wirelessly charge by judging whether to accept a wireless charging request upon receiving the wireless charging request from one or more electronic devices receiving the power service information, and a power transmitter for supplying power to the one or more searched electronic devices under the control of the communication and control unit if the wireless charging request is accepted.

In accordance with still another aspect of the present invention, a wireless charging method includes receiving a request for transmission of power service information from one or more electronic devices, transmitting the power service information and receiving a wireless charging request from one or more electronic devices receiving the power service information, determining whether to accept the wireless charging request, and supplying power to the one or more searched electronic devices if the wireless charging request is accepted.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same or similar drawing reference numerals will be understood to refer to the same elements, features and structures.

DETAILED DESCRIPTION OF EMBODIMENTS OF THE PRESENT INVENTION

Embodiments of the present invention are described in detail with reference to the accompanying drawings. The following detailed description includes specific details in order to provide a thorough understanding of the present invention. However, it will be apparent to those skilled in the art that the present invention may be practiced without such specific details.

Figure 1:
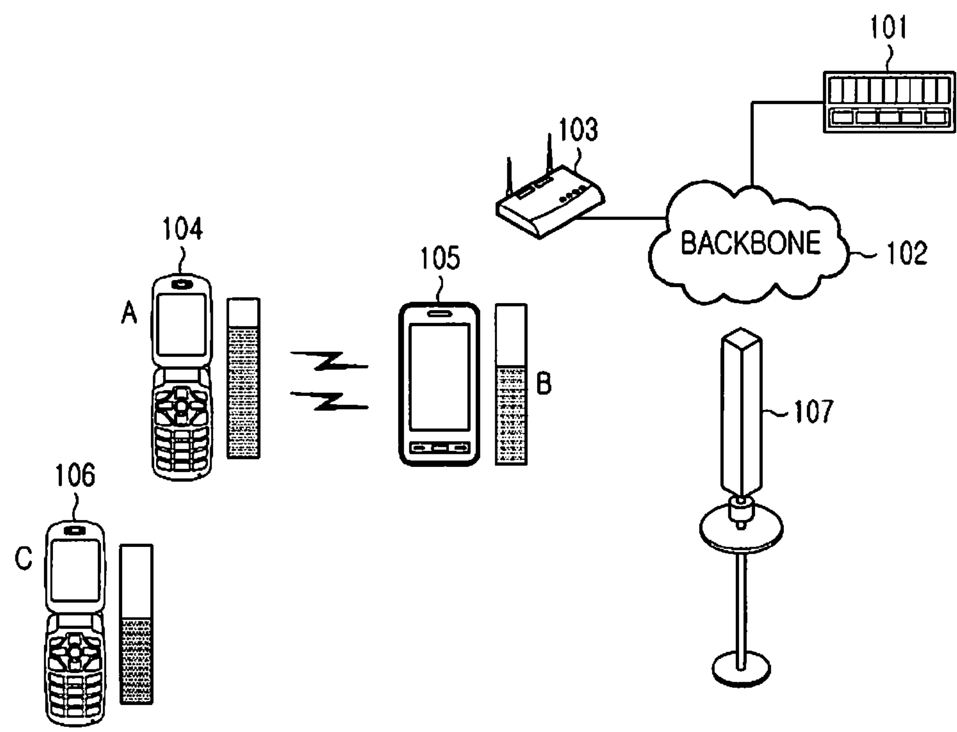
FIG. 1 is a diagram illustrating a system for performing wireless charging through a power service subscription according to an embodiment of the present invention.

FIG. 1 is a diagram illustrating a system for performing wireless charging through a power service subscription according to an embodiment of the present invention. The system of FIG. 1 includes a base station server 101, a backbone 102, a base station 103, and a plurality of electronic devices 104 to 107. The electronic devices 104 to 107 include a mobile terminal A 104, a mobile terminal B 105, a mobile terminal C 106, and a charging station (a charging pad) 107. Bars beside the mobile terminals 104 to 106 represent the amount of battery power. The system may sufficiently perform wireless charging even though the mobile terminals 104 to 106 are replaced with other electronic devices having batteries.

Referring to FIG. 1, the base station server 101 manages fees and communication of the mobile terminals 104 to 106 and the charging station 107, which are connected to the base station 103 within its management range. The backbone 102 refers to a network which connects the base station 103 to the base station server 101. The base station 103 serves as a relay which connects the mobile terminals 104 to 106 or the charging station 107 connected thereto to the backbone 102. The base station 103 may perform a function of an access point, when it is equipped with a near-distance communication modem such as an arbitrary communication protocol in a ZigBee, Bluetooth®, Wi-Fi, Ultra Wide-Band (UWB) or a wireless charging system. The mobile terminals 104 to 106 and the charging station 107 are electronic devices which can be wirelessly charged, and can wirelessly charge therebetween.

Figure 2:
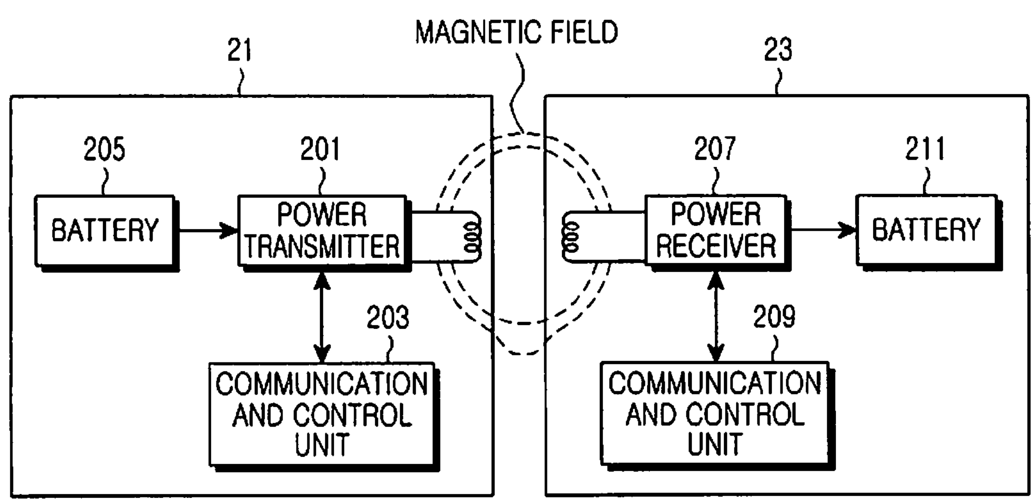
FIG. 2 is a block diagram illustrating internal construction of electronic devices which are capable of performing wireless charging according to an embodiment of the present invention.

FIG. 2 is a block diagram illustrating internal construction of electronic devices 21 and 23 which are capable of performing wireless charging according to an embodiment of the present invention.

Referring to FIG. 2, the electronic devices for transmitting power include a power transmitter 201, a communication and control unit 203, and a battery 205. The power transmitter 201 receives power from the battery 205 under the control of the communication and control unit 203, converts the power into power of a wirelessly transmittable form, and transmits the converted power through a coil connected thereto. The communication and control unit 203 controls the power transmitter 201 to transmit power until the power reaches a preset threshold value and transmits the contents of power transmission by communicating with the base station 103. The battery 205 transmits stored power to the power transmitter 201 in response to a request of the power transmitter 201.

The electronic device 23 for receiving power includes a power receiver 207, a communication and control unit 209, and a battery 211. Upon receiving the converted power from the electronic device 21, the power receiver 207 converts the received power into power usable by the battery 211 and transmits the converted power to the battery 211. The power receiver 207 receives the power through a coil connected thereto and basically receives the power under the control of the communication and control unit 209. The communication and control unit 209 controls the power receiver 207 to receive power above a preset threshold value and transmits the contents of power reception by communicating with the base station 103. If power transmission is stopped from the electronic device 21 before power reaches the preset threshold value, the communication and control unit 209 communicates with the base station 103 to search other electronic devices so that power can be received. For example, assuming that the electronic devices 21 and 23 are the mobile terminals 104 and 105 shown in FIG. 1, respectively, and the amount of battery power received by the mobile terminal 105 from the mobile terminal 104 is insufficient, the mobile terminal 105 may receive power through the mobile terminal 106 or the charging station 107. The battery 211 supplements insufficient power by receiving power from the power receiver 207.

Although each of the communication and control units 203 and 209 is shown by one constituent element in FIG. 2, it may be separated into a communication unit and a control unit to perform respective roles.

A process for performing wireless charging will be described with reference to FIGS. 1 and 2.

Figure 3:
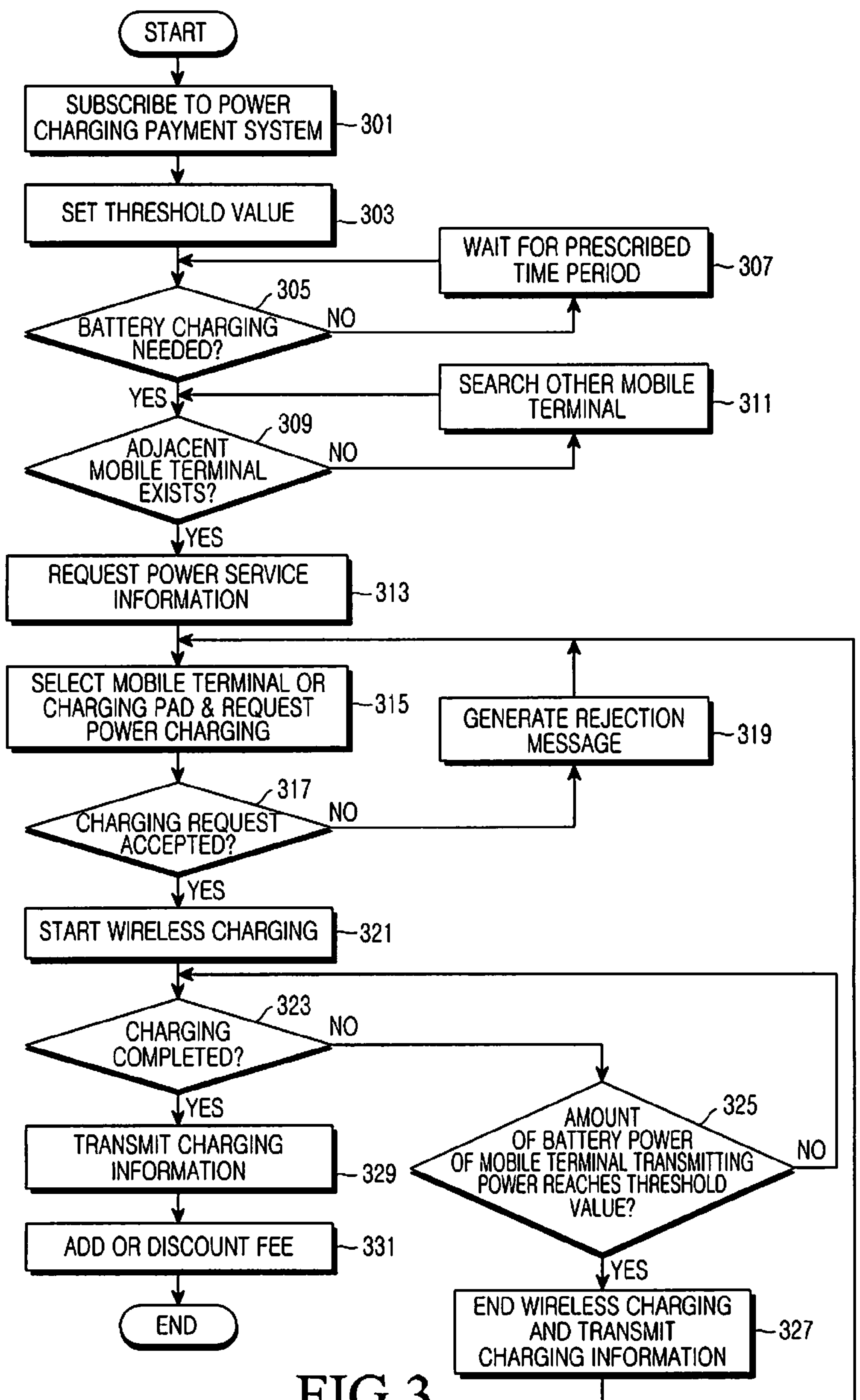
FIG. 3 is a flow chart illustrating a wireless charging process between electronic devices according to an embodiment of the present invention.

FIG. 3 is a flow chart illustrating a wireless charging process between electronic devices according to an embodiment of the present invention. It is assumed that an electronic device which requests wireless charging is the mobile terminal 105.

Referring to FIG. 3, the mobile terminal 105 subscribes a power charging payment system in order to wirelessly charge a mobile terminal adjacent thereto in step 301. The power charging payment system refers to a payment system for transmitting and receiving power between mobile terminals or charging stations which subscribe to a power charging payment system of the same communication company and adding or discounting a fee in proportion to the amount of transmitted or received power. This is to perform power charging only between mobile terminals which subscribe to a power charging payment system. Even if mobile terminals subscribe to an additional service for power charging instead of the power charging payment system, they may be wirelessly charged. If the mobile terminal 105 subscribes to the power charging payment system, it sets a threshold value in step 303 in order to perform power charging when the amount of power remaining in a battery is less than the threshold value. The mobile terminal 105 determines whether its battery needs to be charged in step 305 based on the threshold value set in step 303. If no battery charging is needed, the mobile terminal 105 waits for a prescribed time period in step 307 and thereafter goes to step 305 to determine whether its battery needs to be charged.

If battery charging is needed, the mobile terminal 105 determines in step 309 whether there is at least one mobile terminal adjacent thereto. The at least one mobile terminal may be the mobile terminals 104 and 106 and the charging station 107 as shown in FIG. 1. If no adjacent mobile terminal exists, the mobile terminal 105 continues to search other mobile terminals in step 311. If at least one mobile terminal adjacent to the mobile terminal 105 is found, step 309 is followed by step 313. It is assumed that the found mobile terminals are the mobile terminals 104 and 106 and the charging station 107.

In step 313, the mobile terminal 105 requests the searched mobile terminals 104 and 106 and the charging station 107 to transmit power service information. The power service information includes information as to whether a mobile terminal subscribes to a power charging payment system and information about the amount of power remaining in a battery. The mobile terminal 105 receives the power service information from the mobile terminals 104 and 106 and the charging station 107 to select a mobile terminal or a charging station which subscribes to the same payment system as the mobile terminal 105 and is the nearest to the mobile terminal 105 and requests the selected terminal or charging station to perform power charging in step 315. The mobile terminal 105 determines whether a charging request is accepted in step 317. If the charging request is not accepted, the mobile terminal 105 generates a rejection message for the charging request in step 319 and proceeds to step 315 to select the second nearest mobile terminal or charging pad to the mobile terminal 105 among mobile terminals or charging pads which subscribe to the power charging payment system. In FIG. 3, although mobile terminals or charging pads are selected in order of an adjacent distance, they may be selected in order of another reference such as the amount of power remaining in their batteries. If charging request is accepted in step 317, the mobile terminal 105 starts wireless charging with the mobile terminal or charging pad accepting the charging request in step 321.

The mobile terminal 105 determines whether wireless charging is completed in step 323 by judging whether the amount of received power reaches a preset threshold value. If wireless charging is not completed, the mobile terminal 105 determines whether the amount of power of a battery of a mobile terminal which transmits power reaches a preset threshold value in step 325. This is to transmit the amount of power above a preset threshold value out of the amount of power remaining in a battery of a mobile terminal which transmits power. If the amount of power of a battery of a mobile terminal which transmits power does not reach a preset threshold value, the mobile terminal 105 continues to wirelessly charge and proceeds to step 323, and if it reaches a preset threshold value, the mobile terminal 105 ends wireless charging and transmits charging information to the base station in step 327. Step 327 is followed by step 315.

If wireless charging is completed in step 323, the mobile terminal 105 transmits charging information to the base station in step 329. Next, the base station adds or discounts a fee of a mobile terminal with reference to the charging information in step 331.

Figure 4:
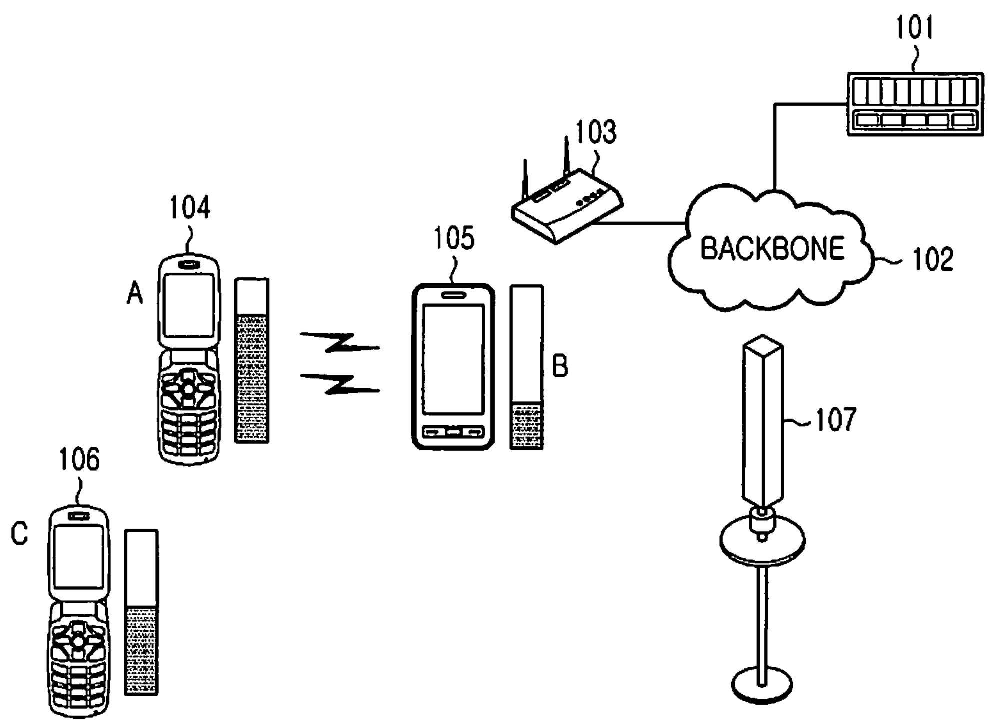
FIGS. 4 and 5 are diagrams illustrating systems for performing wireless charging between electronic devices which subscribe to a power service according to an embodiment of the present invention.
Figure 5:
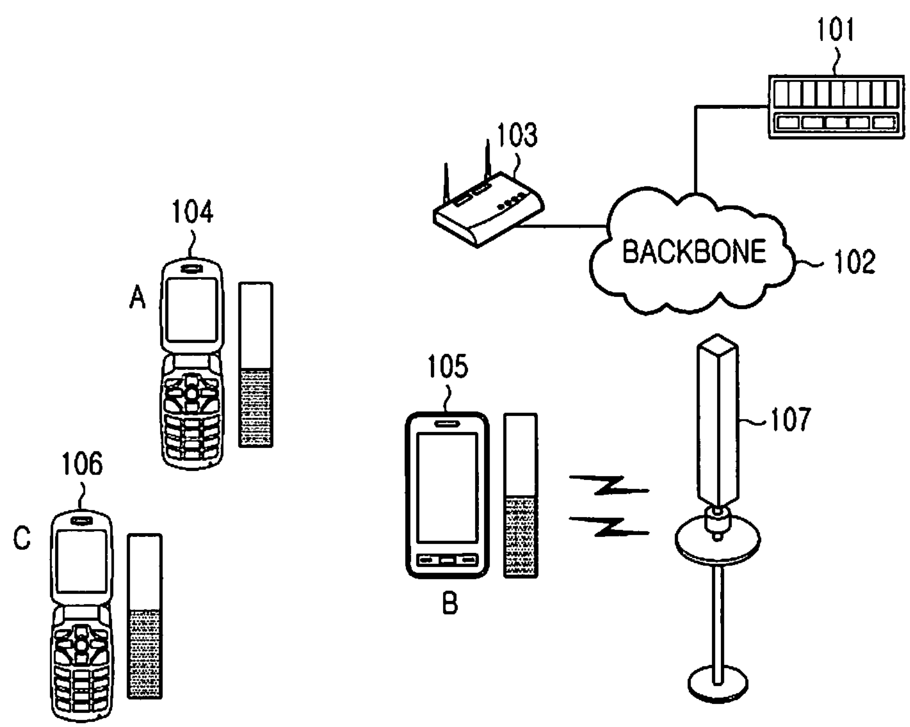

FIGS. 4 and 5 are diagrams illustrating systems for performing wireless charging between electronic devices which subscribe to a power service according to an embodiment of the present FIG. 4 illustrate a system for performing initial wireless charging between electronic devices. FIG. 5 illustrates a system for performing additional wireless charging with another electronic device when desired wireless charging is not performed. Each of the systems of FIGS. 4 and 5 includes a base station server 101, a backbone 102, a base station 103, and a plurality of electronic devices 104 to 107. The electronic devices 104 to 107 are defined as a mobile terminal A 104, a mobile terminal B 105, a mobile terminal C 106, and a charging station 107. Bars beside the mobile terminals 104 to 106 represent the amount of battery power.

Referring to FIG. 4, the mobile terminal 105 confirms that the amount of power remaining its battery is less than a preset threshold value and requests the base station 103 to determine whether at least one adjacent mobile terminal is present. It is assumed that the mobile terminals 104 and 106 and the charging station 107 are adjacent to the mobile terminal 105. The base station 103 transmits the request information to the base station server 101 through the backbone 102. The base station server 101 transmits response information to the received request information to the base station 103 through the backbone 102. The mobile terminal 105 confirms that the mobile terminals 104 and 106 and the charging station 107 are adjacent thereto and requests the mobile terminals 104 and 106 and the charging station 107 to transmit power service information through the base station 103.

The power service information includes information as to whether a mobile terminal subscribes to a power charging payment system and information about the amount of power remaining in a battery. Since the charging station 107 does not include a battery, only information indicating that the charging station 107 is a rechargeable charging pad is included in the power service information of the charging station 107. The mobile terminal 105 selects a nearest mobile terminal which subscribes to a wireless charging payment system. In FIG. 4, it is assumed that the mobile terminal 104 is selected. The base station 103 transmits the power service information received from the base station server 101 to the mobile terminal 105 and the mobile terminal 105 performs wireless charging with the mobile terminal 104 with reference to the received power service information.

However, while wireless charging is performed, the amount of transmission of charging power of the mobile terminal 104 may be less than the amount of charging power desired by the mobile terminal 105. That is, the amount of power to be received by the mobile terminal 105 may be greater than the amount of transmittable power by the mobile terminal 104. A method for charging insufficient power in such a case will now be described with reference to FIG. 5.

Referring to FIG. 5, when the amount of power to be received by the mobile terminal 105 is insufficient even though the mobile terminal 104 has transmitted the amount of transmittable power while the mobile terminal 105 performs wireless charging from the mobile terminal 104, the mobile terminal 105 selects a second nearest mobile terminal or a second nearest charging station which subscribes to the same wireless charging payment system. It is assumed that such a mobile terminal is the charging station 107. The mobile terminal 105 performs wireless charging with the charging station 107 with reference to power service information, thereby supplementing insufficient power.

Although the mobile terminal 105 selects electronic devices to wirelessly charge in order of distance adjacent thereto in FIGS. 4 and 5, it may select electronic devices in order of the amount of battery power by comparing the amounts of battery power of electronic devices included in the power service information. That is, the mobile terminal 105 performs wireless charging first with an electronic device having the greatest amount of battery power among a plurality of adjacent electronic devices. If more battery power is needed, the mobile terminal 105 performs wireless charging with an electronic device having the second greatest amount of battery power. However, when selecting an electronic device to wirelessly charge using the amount of battery power, a charging station having no battery may be set to be manually selected by a user irrespective of an adjacent distance or may be set to be automatically selected by priority over other electronic devices having batteries if it is adjacent to the mobile terminal 105.

Moreover, although the mobile terminal 105 receives the power service information through the base station 103 or the base station server 101 in FIGS. 4 and 5, it may directly request the mobile terminals 104 and 106 and the charging station 107 to transmit the power service information using near field communication.

Thus if the desired amount of power is received, the mobile terminal 105 transmits charging information about the amount of received power to the base station 103. The base station receiving the charging information transmits the charging information to the base station server 101 through the backbone 102. The base station server 101 calculates fees of mobile terminals which have transmitted and received charging power with reference to the charging information. A method for calculating a charging fee using charging information will now be described with reference to FIG. 6.

Figure 6:
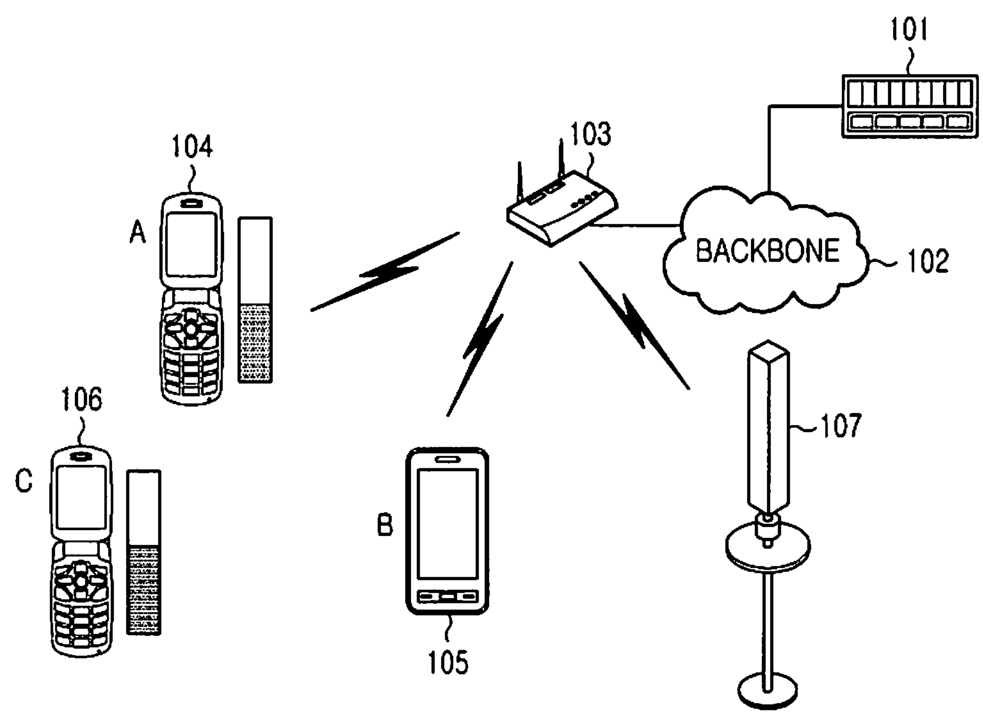
FIG. 6 is a diagram illustrating a system for transmitting charging information by wireless charging according to an embodiment of the present invention.

FIG. 6 is a diagram illustrating a system for transmitting charging information by wireless charging according to an embodiment of the present invention.

Referring to FIG. 6, if the desired amount of power has been received, the mobile terminal 105 ends wireless charging and transmits charging information about the amount of received power to the base station 103. The mobile terminal 104 and the charging station 107 which have transmitted power may transmit charging information about the amount of transmitted power to the base station 103. As shown in FIGS. 4 and 5, since the mobile terminal 105 has received a prescribed amount of power first from the mobile terminal 104 and has received a prescribed amount of power later from the charging station 107, if the mobile terminal 105 transmits the charging information to the base station 103, the base station 103 transmits the received charging information to the base station server 101 through the backbone 102. Then the base station server 101 adds or discounts fees for the mobile terminals 104 and 105 with reference to the received charging information. A fee for a mobile terminal which receives necessary power from other mobile terminals is added and a fee for a mobile terminal which transmits power is discounted. Accordingly, a fee corresponding to the reception of power is added for the mobile terminal 105 and a fee corresponding to the transmission of power is discounted for the mobile terminal 104.

Figure 7:
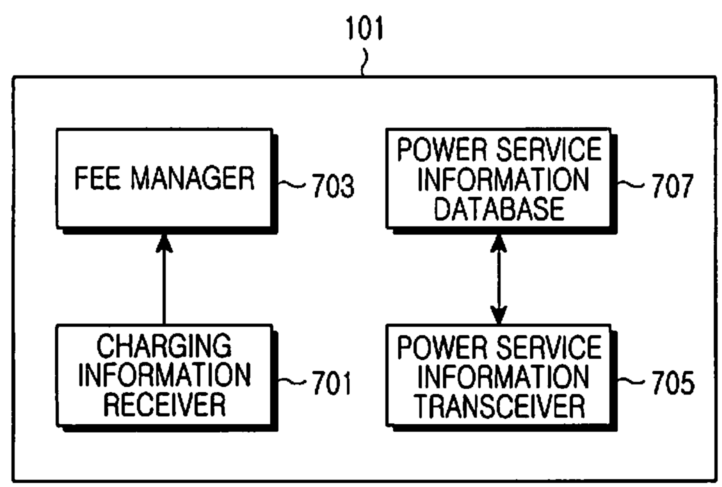
FIG. 7 is a block diagram illustrating an internal construction of a base station server which manages wireless charging between electronic devices according to an embodiment of the present invention.

FIG. 7 is a block diagram illustrating an internal construction of a base station server 101 which manages wireless charging between electronic devices according to an embodiment of the present invention. The base station server 101 includes a charging information receiver 701, a fee manager 703, a power service information transceiver 705, and a power service information database 707.

Referring to FIG. 7, the charging information receiver 701 receives charging information from at least one electronic device which has performed wireless charging and transmits the charging information to the fee manager 703. The charging information includes information about the transmission and reception of wireless charging with a specific mobile terminal. The fee manager 703 adds or discounts fees of electronic devices which have performed wireless charging with reference to the received charging information. A fee is added for electronic devices which have received power and is discounted for electronic devices which have transmitted power.

If a specific electronic device receives a request for power service information of at least one adjacent electronic device, the power service information transceiver 705 transmits the request to the power service information database 707 and transmits the power service information received from the power service information database 707 to the specific electronic device. The power service information includes information as to whether at least one electronic device adjacent to a specific electronic device subscribes to a power charging payment system and information about the amount of power remaining in a battery. The power service information database 707 includes information about all electronic devices located within a range of the base station server 101. For example, the power service information database 707 includes information about which electronic devices subscribe to a power charging payment system and information about the amount of power of a battery of at least one electronic device which subscribes to the power charging payment system. Upon receiving a power service request from the power service information transceiver 705, the power service information database 707 confirms whether at least one electronic device adjacent to a specific electronic device subscribes to a payment system. If there is an electronic device which subscribes to a power charging payment system, the power service information database 707 checks battery charging amount information and transmits the checked result to the power service information transceiver 705.

Although the embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A method for charging power of an electronic device comprising:

searching, by the electronic device, one or more wireless charging electronic devices which provide wireless charging and are adjacent to the electronic device requiring wireless charging;

receiving, by the electronic device, power service information from the one or more searched wireless charging electronic devices, wherein power service information includes whether one or more searched wireless charging electronic devices has battery power of at least a user-definable threshold;

determining, by the electronic device, whether the one or more searched wireless charging electronic can provide wireless charging based on the received power service information;

receiving, by the electronic device, power from one of the searched wireless charging electronic devices when the one or more searched wireless charging electronic devices are determined to be able to provide wireless charging; and if an amount of power supplied from the one of the searched wireless charging electronic devices is less than a desired amount of power, additionally receiving power from another of the searched wireless charging electronic devices after receiving power from one of the searched wireless charging electronic devices.

2. The method of claim 1, wherein the search of the one or more wireless charging electronic devices is performed through a server.

3. The method of claim 1, wherein power service information includes information as to whether the one or more searched wireless charging electronic devices subscribe to a power charging payment system and information about an amount of power remaining in respective batteries of the one or more searched wireless charging electronic devices.

4. The method of claim 1, wherein determining whether the one or more searched wireless charging electronic devices can provide wireless charging comprises determining whether there are wireless charging electronic devices which subscribe to a power charging payment system and have power in respective batteries of the one or more searched wireless charging electronic devices.

5. The method of claim 1, wherein receiving power from the one or more wireless charging searched electronic devices comprises:

selecting all wireless charging electronic devices which subscribe to a power charging payment system among the one or more searched wireless charging electronic devices;

selecting a nearest wireless charging electronic device among the wireless charging electronic devices which subscribe to the power charging payment system; and receiving power from the nearest wireless charging electronic device.

6. The method of claim 1, further comprising transmitting information about an amount of received power to the one or more searched wireless charging electronic devices and a server.

7. The method of claim 6, wherein fees of an electronic device requiring wireless charging and the one or more searched wireless charging electronic devices are added or discounted according to the information about the amount of received power.

8. An electronic device for charging power, comprising:

a power transceiver;

a communication data transceiver; and a processor configured to:

search, through the communication data transceiver, one or more wireless charging electronic devices which provide wireless charging and are adjacent to the electronic device requiring wireless charging, control the communication data transceiver to receive power service information from the one or more searched wireless charging electronic devices, determine whether the one or more searched wireless charging electronic devices can provide wireless charging based on the received power service information, wherein power service information includes whether one or more searched wireless charging electronic devices has battery power of at least a user-definable threshold, if the one or more searched wireless charging electronic devices are determined to be able to provide wireless charging, control the power transceiver to receive power from one of the searched wireless charging electronic devices, and if an amount of power supplied from the one of the searched wireless charging electronic devices is less than a desired amount of power, control the power transceiver to additionally receive power from another of the searched wireless charging electronic devices after receiving power from one of the searched wireless charging electronic devices.

9. The electronic device of claim 8, wherein the processor searches, through a server, the one or more wireless charging electronic devices.

10. The electronic device of claim 8, wherein the processor determines whether the one or more searched wireless charging electronic devices can provide wireless charging by determining whether there are wireless charging electronic devices which subscribe to a power charging payment system and have power in respective batteries of the one or more searched wireless charging electronic devices.

11. The electronic device of claim 8, wherein the processor selects all wireless charging electronic devices which subscribe to a power charging payment system among the one or more searched wireless charging electronic devices, selects a nearest wireless charging electronic device among the wireless charging electronic devices which subscribe to the power charging payment system, and performs a control function to receive power from the nearest wireless charging electronic device.

12. The electronic device of claim 8, wherein the processor controls the communication data transceiver to transmit information about an amount of received power to the one or more searched wireless charging electronic devices and a server.

13. The method of claim 1, wherein each of the one or more wireless charging electronic devices is comprised of a mobile terminal or a charging station.

14. The method of claim 13, wherein the charging station having no battery is selected manually irrespective of an adjacent distance or may be selected automatically by priority over other wireless charging electronic devices having batteries if the charging station is adjacent to the wireless charging electronic device.

15. The method of claim 2, wherein the search of the one or more wireless charging electronic devices is performed through a network and a base station.

16. The electronic device of claim 8, wherein each of the one or more wireless charging electronic devices is comprised of a mobile terminal or a charging station.

17. The method of claim 16, wherein the charging station having no battery is selected manually irrespective of an adjacent distance or may be selected automatically by priority over other wireless charging electronic devices having batteries if the charging station is adjacent to the wireless charging electronic device.

18. The method of claim 9, wherein the communication data transceiver searches, through a network and base station, the one or more wireless charging electronic devices.

* * * * *